Sept. 30, 1958 J. O. LUTZ 2,854,301
PISTON RING EXPANDER AND METHOD OF FORMING SAME
Filed Sept. 6, 1957 2 Sheets-Sheet 1
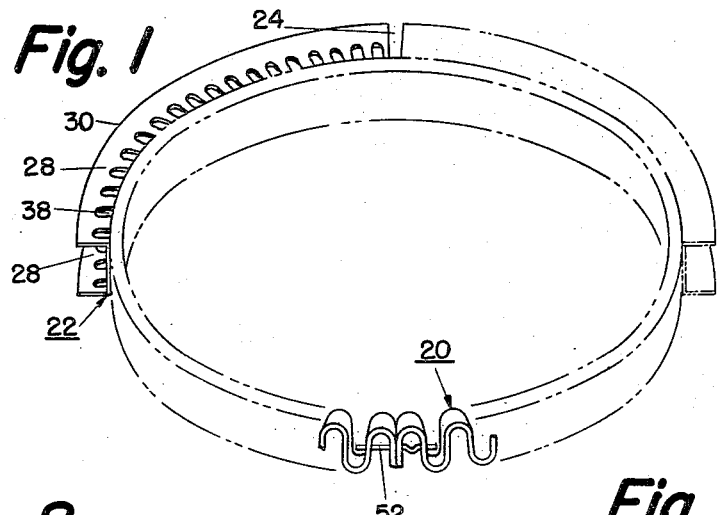
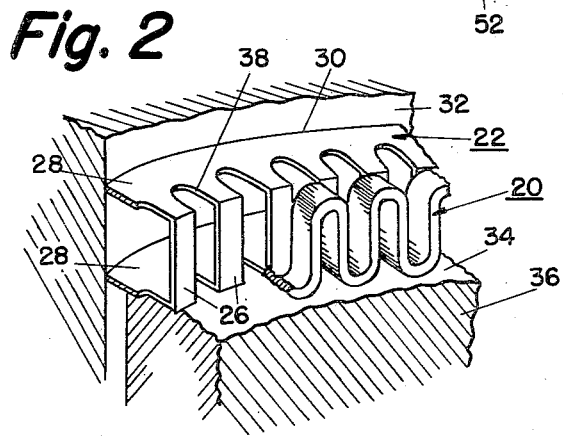
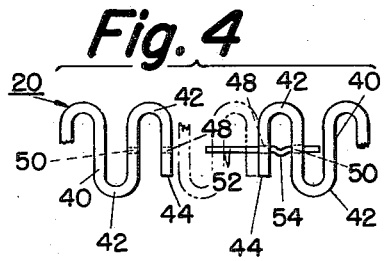
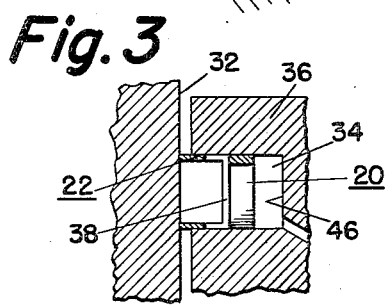
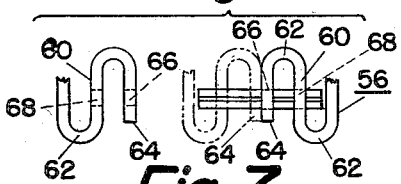
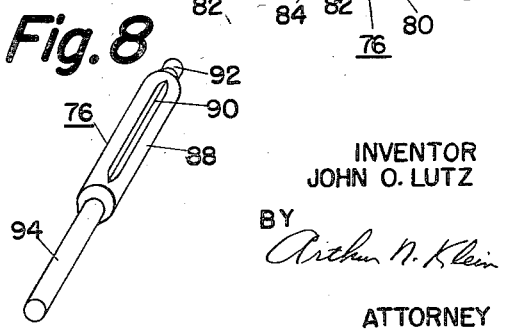
INVENTOR
JOHN O. LUTZ
BY
Arthur N. Klein
ATTORNEY

2,854,301

PISTON RING EXPANDER AND METHOD OF FORMING SAME

John O. Lutz, Ridley Park, Pa., assignor to Wilkening Manufacturing Company, Philadelphia, Pa., a corporation of Delaware Application September 6, 1957, Serial No. 682,439

19 Claims. (Cl. 309—40)

The present invention relates generally to piston rings for use in internal combustion engines, diesel engines, pumps, compressors and the like, and it relates more particularly to expanders installed within the piston groove behind or inward of a piston ring for exerting radially outward spring pressure upon the piston ring so as to maintain it in peripheral juxtaposition with the cylinder wall.

An object of the present invention is to provide a new and improved construction for piston ring expanders. Another object of this invention is to provide a novel free-floating non-bottoming expander for a piston ring or the like which is effective in providing generally circumferentially-uniform radially outward spring pressure for a non-resilient piston ring, which can be simply and inexpensively manufactured, and which can be installed within a piston groove with a minimum of time and effort. Still another object of the present invention is to provide a new free-floating non-bottoming piston ring expander of the trans-split C-shaped type (in which the free ends of the C are held in abutting relationship within the piston groove and which provides the necessary radially outward pressure by compression of the resilient more or less continuous axially corrugated annulus; as distinguished from the radially corrugated type of expander in which alternate loops or bends contact the piston ring and the back wall of the piston groove) wherein the abutting free ends can be easily and positively locked together for greater ease in assembly and greater uniformity in the circumferential distribution of radially outward resilient pressure. A further object is to provide a non-bottoming axially-corrugated expander formed from a sinuously bent strip of ribbon steel or the like, the major transverse dimension or width being radially disposed for greater uniformity of spring pressure, and which is so constructed that the combined radial thicknesses of the piston ring and the expander do not exceed the radial dimension or depth of the piston groove, and which is provided with novel means for quickly and effectively connecting, and securely maintaining the free ends of the expander in properly aligned abutting relationship.

Other objects and advantages of the present invention are apparent in the following detailed description, appended claims and accompanying drawings.

The advantages stemming from, as well as the difficulties inherent in the assembly of, non-bottoming axially corrugated trans-split expanders, wherein the free ends must be maintained in abutting relationship, are well known in the art. See for example Patents 2,293,450 and 2,639,205.

According to the present invention, there has been developed a new and improved expander construction of this general type which gives greater uniformity of circumferentially distributed radially outward spring pressure when formed into a more or less closed continuous annulus and compressed, and which can be installed, especially in relatively larger size piston assemblies in much less time, and with less effort, than other constructions require, and in which, once connected, the free ends are held securely against accidental displacement from their proper abutting relationship, while still being capable of ready dis-assembly when necessary.

In general, the present invention comprises a non-bottoming type of piston ring expander formed from a ribbon (having substantial width, as distinguished from a sheet metal or wire construction) of resilient metal which is formed into an axially corrugated trans-split generally C-shaped configuration, wherein the width of the metal is radially disposed, and wherein generally axially extending more or less parallel legs are integrally connected by alternately upper and lower loops or bends, and wherein the two free end legs as well as the next adjoining legs are provided with holes or openings generally intermediate the radially inner and outer edges of the expander and also generally intermediate the axially displaced (i. e., top and bottom) surfaces of the expander, and wherein a fastening pin or the like is first inserted for about half its length through the two holes at one end of the expander and locked against appreciable circumferential or peripheral movement with respect thereto, the remaining half of the fastening pin being left in protruding relationship until the expander is to be installed, and wherein installation of the expander within the piston groove is finally effected by lining up the two holes in the other end of the expander with the protruding portion of the fastening pin and bringing the two ends of the expander together so that the aforesaid protruding portion passes through said two holes permitting the two end legs of the expander to be brought into abutting relationship and effectively maintaining said two end legs in aligned abutting position and eliminating any possibility of accidental displacement such as might cause the two ends of the expander to ride over and overlap one another (thereby preventing inoperativeness of the expander resulting from destruction of the continuous annulus configuration). When the protruding portion of the fastening pin is inserted into the holes at the opposite end of the expander, it can either be locked against appreciable circumferential movement with respect to said opposite end or be left unlocked.

For the purpose of illustrating the invention, forms thereof, which are presently preferred, are shown in the accompanying drawings, it being understood however that this invention is not limited to the precise instrumentalities and arrangements disclosed.

Referring to the accompanying drawings in which like reference characters indicate like parts throughout:

Figure 1 is a partial perspective view of an expander embodying the present invention in co-acting relationship with an oil control piston ring.

Figure 2 is an enlarged fragmentary perspective view of the expander and piston ring of Fig. 1, as they appear when installed within a piston groove and in a cylinder; parts being broken away for greater clarity of illustration.

Figure 3 is a fragmentary cross-sectional view of the assembly of Fig. 2.

Figure 4 is an enlarged fragmentary elevational view of the expander of Fig. 1 as it appears prior to installation on a piston; that is, with the fastening pin inserted in and locked to one end of the expander, while the other half of the fastening pin protrudes ready for connection to the other end of the expander.

Figure 5 is an enlarged fragmentary elevational view of an expander forming another embodiment of this invention.

Figure 6 is a further enlarged perspective view of the fastening pin forming part of the embodiment of Fig. 5.

Figure 7 is an enlarged fragmentary elevational view, generally like that of Fig. 5, but showing still another embodiment of the present invention.

Figure 8 is a further enlarged perspective view, generally like that of Fig. 6, but showing the fastening pin forming part of the embodiment of Fig. 7.

Figure 9:
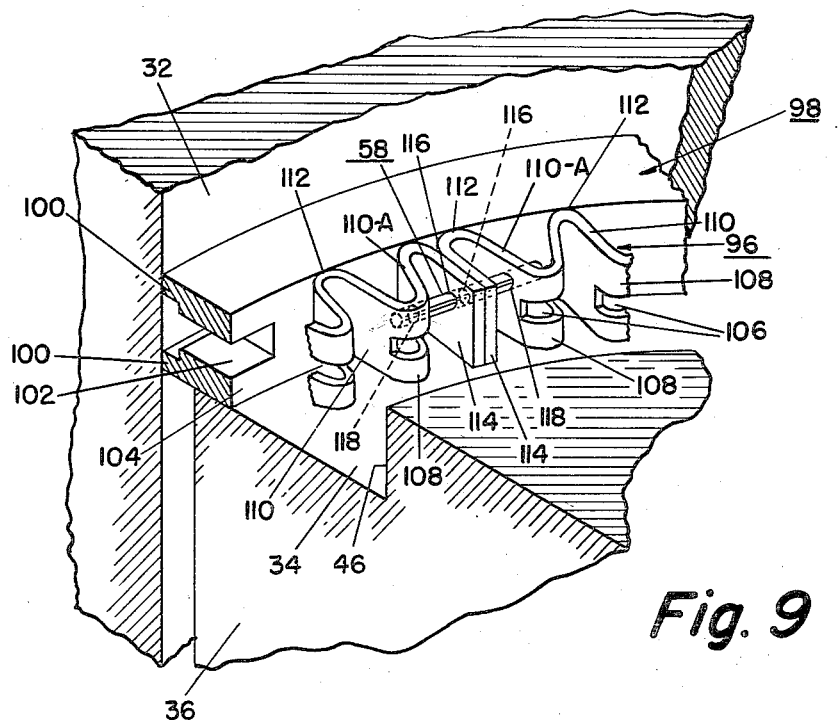
Figure 9 is a fragmentary perspective view, with parts broken away, generally like that of Fig. 2, but showing yet another form of the expander of this invention, as used with a different type of piston ring.

In Figs. 1, 2 and 3, there is shown an expander spring 20 forming one embodiment of the present invention, shown as it appears when used in conjunction with an oil-control piston ring 22.

The piston ring 22 is of the type shown in Patent 2,639,205, granted May 19, 1953, and comprises an integrally formed trans-split annulus, of flexible but non-resilient sheet metal or the like, having a gap or split 24, best shown in Fig. 1. The ring 22 is of generally U-shaped cross-sectional configuration with an axially disposed back or inner wall 26 and radially outwardly extending top and bottom walls or flanges or lands 28; the outer convex circumferential edges 30 of the lands 28 serving to contact the cylinder wall 32, when the piston ring is installed in the groove 34 of a piston 36, as indicated in Figs. 2 and 3.

The piston ring 22 is provided with a plurality of circumferentially-distributed openings or slots 38, for the passage of oil through the piston ring; the openings or slots 38 extending axially along the back wall 26 and also extending radially outwardly part way along both of the lands 28 but terminating short of the cylinder-contacting peripheral edges 30.

The expander 20 of the present invention is integrally formed from a length of resilient metal or the like, which is axially corrugated with generally straight axially disposed intermediate portions 40 and alternating top and bottom arcuate portions 42 which extend generally through about 180 degrees of arc. The expander is preferably formed from resilient ribbon steel or other metal having a width or radial dimension at least twice its thickness. The overall axial dimension of the expander is preferable at least twice its radial dimension or width. Preferably, for greater uniformity of pressure, the metal of the expander 20 is somewhat thicker than the sheet metal of the piston ring 22.

The expander 20, like the ring 22, circumferentially curved into a trans-split annulus. It has generally straight axially disposed free end portions 44 which preferably (though not necessarily) extend in the same axial direction (that is, both up or both down). The inherent resilience of the expander 20 normally tends to spread the opposed end portions apart circumferentially to create a gap or split, as indicated in the solid line showing of Fig. 4. However, when compressive force is exerted upon the expander, the gap is closed and the end portions are brought into abutting relationship, as indicated in Fig. 1 and also in the dot-dash line showing of Fig. 4. When the free ends 44 have been brought into abutment, the expander 20 acts like a more or less continuous uninterrupted annulus, the inherent resilience of which generates more or less uniformly circumferentially distributed radially outward pressure under compression. Thus, when the expander is installed in the piston groove 34 behind the ring 22, the compression of the cylinder wall, transmitted through the ring 22, causes the expander to exert radially outward spring pressure, so as to maintain the piston ring lands 28 in firm contact with the cylinder wall 32, in a manner known in the art.

However, should the free end portions 44 accidentally be displaced from their abutting relationship, there is no longer present a continuous annulus such as is essential to the spring action of the expander. Because the axial dimension of the expander is not appreciably less than the axial dimension of the piston groove 34, as indicated in Fig. 3, there is no possibility of accidental axial displacement of the end portions 44. However, it is necessary to provide effective means for preventing relative radial displacement of the end portions 44 where the radial clearance between the back wall 46 of the piston groove 34 and the radially inner edge of the piston ring and expander assembly is (as is desirable) sufficiently large not to make such displacement impossible.

To this end, aligned openings or holes 48 are provided in the two free end portions 44, and similar openings or holes 50 are provided in the next adjoining intermediate axial portions 40 of the expander 20. A fastening pin 52 of metal or the like is inserted through the holes 48 and 50 at one end of the expander so that, as indicated in Fig. 4, about half its length protrudes beyond the free end portion 44 generally half-way axially intermediate the upper and lower edges of the expander. In Figs. 1 and 4, the fastening pin 52 is shown as a length of solid rod, of cylindrical shape. The pin 52 should have sufficient rigidity and resistance to bending as to lock the two free ends securely against accidental displacement relative to each other when interconnected.

I prefer to lock the fastening pin 52 against accidental withdrawal from the two holes 48 and 50 into which it is first inserted as described above. This can be done by forming a crimp or bend 54, after insertion, in that portion of the pin 52 which is between the axial portions 44 and 40, as shown in Figs. 1 and 4, employing any conventional crimping tool (not shown) for this purpose. Since the overall axial dimension of the relatively sharply bent crimp 54 is greater than the diameter of the holes 48 and 50 (which, in this embodiment, are generally the same size), it is obvious that withdrawal of the pin 52 is effectively prevented, following the formation of the crimp.

During installation of the expander 20 and piston ring 22 within the cylinder and in the piston groove 34, the other free end of the expander is brought toward the end carrying the pin 52 until the protruding end of the pin passes through the holes 48 and 50 of said other end prior to the time at which the free ends 44 come into contact. For clarity of illustration, the other end of the expander is indicated as moving from a spaced solid line position to an abutting dash-dot line position, while the end carrying the pin 52 is stationary.

In actual practice, both ends of the expander would most likely move toward each other to close the gap.

The expander 20 and piston ring 22 are first placed in the piston groove 34 in generally the relationship indicated in Fig. 1; that is, with the ring 22 surrounding the expander 20 and the ring gap 24 circumferentially displaced substantially from (preferably diametrically opposed to) the free end portions 44 of the expander. Conventional tools are then used to install the piston, with its ring assemblies, in the cylinder 32. As a result of such installation, the slightly oversize expander and ring assembly is radially inwardly compressed somewhat, so as to create in the resilient expander the radially outward circumferentially distributed force needed to maintain the outer peripheral edges of the ring in contact with the cylinder wall.

Where the fastening pin of the present invention is not used, the installation of the assembly within the cylinder is a delicate time-consuming and frequently vexing operation due to the tendency of the free end portions to shift radially relative to each other and hence to be displaced from their necessary abutting position. To combat this, the total radial dimension or depth of the piston ring and expander was made so large, relative to the radial dimension or depth of the piston groove, that the back clearance in the groove (i. e., the radial dimension from the inner or back edge of the expander to the inner or back wall 46 of the groove) was too small to permit compression and installation within the cylinder in the event the free end portions of the expander were accidentally radially displaced from their proper aligned abutting position during installation. While this device took care of the possibility of installations wherein the expander is inoperative because its free end portions are not in abutment (and hence cannot exert radially outward pressure on the piston ring), it did not simplify the installation process.

Indeed, it actually made installation more difficult (since the slight back clearance in the piston groove makes manipulation of the ring and expander assembly during installation even more complicated) and tended to discourage use of the highly effective non-bottoming expander.

According to the novel construction of the present invention, installation is greatly expedited and any possibility of accidental radial displacement of the free end portions of the expander is completely eliminated.

Thus, once the fastening pin is secured to one end of the expander 20 and its protruding portion inserted into the holes 48 and 50 of the other end, as described above, the free end portions 44 are securely and positively locked against displacement from their aligned abutting relationship. With the problem of accidental displacement eliminated, the total radial dimension of ring and expander, relative to the piston groove, can be reduced to give greater back clearance (expediting manipulation), as indicated in Fig. 3, from which it can be seen that the back clearance is not small enough to accommodate the assembly with the expander ends overlapped. Since he knows that the expander ends are securely anchored against accidental displacement, and since the additional back clearance in the piston groove makes manipulation easier, the mechanic can install the assembly within a cylinder in a fraction of the time heretofore needed.

In the form of Figs. 1 and 4, the fastening pin 52 is preferably a straight rod (except for crimp 54); the holes 48 and 50 being slightly oversize to compensate for the slightly arcuate closing movement of the opposed free end portions. The radial dimension of the expander is sufficient to ensure complete recessing of the pin 52. The pin could of course be slightly curved and the holes 48 and 50 correspondingly placed to accommodate it.

In Fig. 5, there is shown another embodiment of the present invention comprising an expander 56 and self-locking fastening pin 58, which is separately shown in Fig. 6.

The expander 56 generally resembles the expander 20 described above with generally straight and axially disposed intermediate portions 60, top and bottom arcuate portions 62 and straight parallel axially disposed free end portions 64 (extending in the same axial direction). Holes 66 are provided in the free end portions 64, while holes 68 are provided in the next adjoining intermediate portions 60.

The self-locking fastening pin 58 is of conventional construction and comprises a longitudinally split tube of resilient metal or the like capable of being compressed to bring its longitudinal free edges 70 into abutment (thereby giving a generally circular cross-sectional configuration), but tending to spring apart, when released from compression to give the generally C-shaped cross-sectional configuration shown in Fig. 6.

The pin 58 is compressed and inserted for about half its length through the aligned holes 66 and 68 at one end of the expander 56, after which it is released and springs apart until it locks frictionally within the holes and is prevented from inadvertent longitudinal withdrawing movement relative to the holes.

During installation, the opposite end of the expander 56 moves (from the solid line position to the dash-dot line position of Fig. 5) into position wherein the end portions 64 abut and, in the process, the protruding end of the pin 58 passes through the holes 66 and 68 of said opposite end so as to lock the abutting end portions of the assembled expander against accidental displacement in the same manner as described above in connection with the embodiment of Fig. 1.

Preferably, the arcuate end edges of the fastening pin 52 are beveled as at 72 for greater ease of insertion, especially during the installation operation when the protruding half of the pin passes through the holes 66 and 68 in the opposite end of the expander 56. These opposite-end holes can, if desired, be made slightly larger than the ones in the end to which the pin is first affixed so as further to expedite assembly within the cylinder. However, to avoid the necessity of having a "left" and "right" end on the expander (which would further complicate assembly) I prefer to make all the holes 66 and 68 the same size. In this connection, it is pointed out that, during the final assembly operation, there is no danger of the pin 52 being appreciably longitudinally displaced by reason of frictional compression as the apertured free end portion 64 of the opposite end of the expander passes along the protruding half of the pin. Thus, as is also the case in the embodiment of Fig. 1, the length of the fastening pin is only slightly less than the total distance between the two unapertured intermediate portions next adjacent the intermediate portions containing the holes 68 or 50, and any longitudinal movement of the pin initiated during installation is halted (by contact of the end of the pin with the adjoining unapertured intermediate portion of the expander) almost immediately and long before the pin can shift from its proper operative relationship with the four holes 66 and 68 (or 48 and 50).

In Fig. 7, there is shown still another embodiment of the present invention comprising an expander 74 and a fastening pin 76 which is separately shown in Fig. 8.

The expander 74 more or less resembles the expanders 20 and 56 described above, except that it is more nearly sinuously axially corrugated. That is, the intermediate axially disposed portions 78 are alternately oppositely inclined from the vertical or axial plane and are slightly curved, while the top and bottom arcuate portions 80 are bent through somewhat less than 180 degrees of arc. Preferably, the axially disposed free end portions 82 are straight and disposed generally in true vertical or axial planes (extending in the same axial direction) as in the above-described embodiments, so as to provide parallel abutting surfaces in the assembled expander. Holes 84 are provided in the end portions 82 while aligned holes 86 are provided in the next adjoining intermediate portions 78.

The fastening pin 76 is a positive locking press fit fastener of the type sold commercially under the name "Groov-Pin" by Groov-Pin Corporation. Thus, the pin 76 has a main cylindrical (although tapered configuration can also be employed) portion 88, with an axially-extending groove 90, of appreciable depth and of inwardly tapered V-shaped configuration, formed thereon. A relatively short co-axial pilot portion 92, of slightly reduced diameter, is formed at one end of the grooved main portion 88.

At the other end of the grooved main portion 88, there is formed an elongated ungrooved co-axial cylindrical portion 94 of slightly reduced diameter; the axial dimension of the portion 94 being about equal to the combined axial dimension of the main portion 88 and the pilot portion 92.

The pin 76 is first installed on one end of the expander by inserting the short pilot portion 92 into the hole 84 and then hammering or otherwise driving the pin so that the main cylindrical portion 88 (which is normally slightly oversize relative to the holes 84 and 86) is forced through the holes 84 and 86 and into the position shown in Fig. 7 (wherein the pilot portion 92 is just short of the adjoining unapertured intermediate portion 78. The groove 90 imparts a small degree of resilient compressibility to the cold rolled steel (or other metal) of which the pin is formed and enables the main portion to be driven through the slightly undersize holes 84 and 86 and then to be securely frictionally locked therewithin.

During installation, the opposite end of the expander 74 moves (from the solid line position to the abutting dash-dot line position of Fig. 7) so that its holes 84 and 86 pass over and along the slightly undersize protruding cylindrical portion 94 of the fastening pin 76. Thus, the abutting free end portions 82 are locked against accidental radial or axial displacement in the same manner as described above in connection with the embodiments of Figs. 1 and 5.

It is apparent that in this embodiment as well as those described hereinabove, the fastening pin is locked against longitudinal movement with respect to at least one end of the expander, and that the fastening pin passes through holes in two generally axial portions at both ends of the tran-split axially corrugated expander with slight or no clearance relative to the holes, whereby the abutting free axial end portions are securely locked against accidental radial (as well as axial) displacement, so that the piston ring and expander assembly can be installed within a piston groove having sufficient depth or radial dimension to permit compression of the assembly completely within the groove during installation so that installation is simplified without danger of inadvertent inoperative overlapping of the expander ends.

In Fig. 9, which generally resembles Fig. 2, there is shown an expander 96 forming another embodiment of this invention, as used with a conventional one-piece oil-control piston ring 98 of conventional construction, shown for example in Wilkening Patent 2,293,450. The piston ring 98, which may be of cast iron or other suitable material, is in the form of a trans-split annulus having a gap (not shown); the gap being appreciably circumferentially spaced from (and preferably generally diametrically opposed to) the abutting free end portions (to be described) of the expander in the completed assembly.

A pair of axially spaced lands 100 are provided along the outer periphery of the piston ring; the lands 100 being maintained in contact with the cylinder wall 32 by the outward pressure of the expander 96 when the assembly is installed within the groove 34 of the piston 36 in a manner similar to that described above in connection with the embodiment of Fig. 2. The ring 98 is provided with a plurality of circumferentially spaced oil drain openings 102 extending radially therethrough at a level axially intermediate the lands 100 and permitting oil to pass inward through the radially inner or back peripheral wall 104 of the ring.

The expander 96 differs from the embodiments previously described in that it is radially, rather than axially, corrugated, though still being free-floating and non-bottoming and providing radially outward pressure for the piston ring by compression of a more or less continuous resilient annulus, as will be described.

Thus, the expander 96 is formed by first corrugating a strip of resilient steel or the like to provide alternating oppositely curved arcuate portions and intermediate connecting portions. The width of the corrugated strip is preferably substantially greater than (more preferably twice as much as) its thickness.

By "width" is meant the perpendicular distance between alternate arcuate portions, while "thickness" refers to the distance from one edge of the metal strip to the other measured at right angles to the width.

Slots 106 are formed in the strip so that they extend around the arcuate portions 108 at one edge of the corrugated strip and part way along the intermediate connecting portions 110. The opposite row of arcuate portions 112 of corrugated strip are left unslotted. The slots 106 can be formed in the resilient steel strip either before or after it is corrugated.

The corrugated strip is then bent circumferentially into a generally C-shaped trans-split annulus, wherein the slotted arcuate portions 108 are disposed along the radially inner periphery of the annulus while the unslotted arcuate portions 112 are disposed along the radially outer periphery. In Fig. 9, the arcuate portions 108 and 112 are shown as extending through somewhat less than 180 degrees of arc with the intermediate connecting portions 110 in inclined non-parallel relationship to each other, in a manner analogous to the embodiment of Fig. 7. Of course, the arcuate portions 108 and 112 could be made to extend through a full 180 degrees of arc and the intermediate connecting portions could be made generally parallel in a manner resembling the embodiments of Figs. 4 and 5.

The expander 96 is provided with generally parallel free end portions 114 which are generally radially disposed in the installed expander, as indicated in Fig. 9. Each of the free end portions 114 is provided with a hole 116 which preferably is generally centered both radially and axially of the expander. The connecting intermediate portion 110-A next adjoining each free end portion is also provided with a hole 118, generally in line with the hole 116. In Fig. 9, the free end portions 114 of the expander are shown as being held in aligned abutting relationship by the self-locking fastening pin 58 shown in Fig. 6; the pin passing through the four holes 116 and 118 in a manner like that described in connection with Fig. 5.

As in the embodiment of Figs. 2 and 3, there is sufficient radial clearance between the inner periphery of the expander 96 (formed by the slotted arcuate portions 108) and the back wall 46 of the piston groove 34 to simplify assembly; the fastening pin 58 securely locking the abutting free end portions 114 against accidental radial displacement (into overlapping and inoperative relationship) and hence eliminating the need for a smaller back clearance, as more fully described hereinabove. The outer periphery of the expander 96 (formed by the unslotted arcuate portions 112) bears against the back wall 104 of the piston ring 98 and exerts radially outward pressure thereon when the assembly is installed within the cylinder.

The manner of installing the expander 96 is similar to that described above in connection with the embodiment of Fig. 5 (and, indeed, Fig. 5 would be illustrative of the manner of securing the free end portions of the expander 96 in abutting relationship if said view were considered as a top plan view). Thus, the fastening pin 58 is inserted, for about half its length, through holes 116 and 118 in portions 114 and 110-A respectively at one end of the expander. The longitudinally split pin 58 (which is compressed somewhat during insertion) is released so that it is frictionally locked relative to holes 116 and 118. The two ends of the expander 96 are then brought together; the holes 116 and 118 at the opposite end passing over the protruding half of the pin 58 until the two free end portions 114 come into abutment, as in Fig. 9, whereupon the pin 58 prevents accidental displacement of the end portions 114 from their abutting aligned position during installation of the expander and piston ring assembly in the cylinder.

Of course, fastening pins 52 or 76 could be used instead of pin 58 in a manner similar to the previously described embodiments. The expanders 20, 56 and 74 could be used with ring 98, while expander 96 could be used with ring 22.

The present embodiments are to be considered in all respects merely as illustrative and not restrictive; this invention being capable of embodimen in other specific forms without departure from the spirit or essential attributes thereof. Accordingly, reference should be made to the appended claims, rather than to the foregoing description, in determining the scope of the present invention.

Having thus described my invention, I claim as new and desire to protect by Letters Patent the following:

1. For use with a piston ring or the like, a non-bottoming expander comprising a strip of resilient metal or the like which is bent circumferentially into a generally C-shaped trans-split annulus and which is also corrugated with alternating oppositely curved arcuate portions and intermediate connecting portions, said trans-split annulus having generally parallel free end portions constructed and arranged to be brought into aligned abutting relationship in a more or less radial plane when the expander is circumferentially compressed whereby the expander exerts circumferentially distributed radially outward spring pressure upon the surrounding piston ring, the two free end portions having aligned holes formed therein; and an elongated relatively rigid fastening pin of metal or the like passing through the hole in the free end portion at one end of said trans-split annulus and being held against withdrawing movement relative to said end, said fastening pin having a substantial portion of its length protruding beyond said last-mentioned free end portion and toward the opposite free end portion, the protruding portion of said pin being constructed and arranged to pass through the hole in the opposite free end portion when the two free end portions are brought together, said fastening pin being contained within the confines of the assembled expander and operating to prevent displacement of the free end portions from their aligned abutting relationship.

2. A construction according to claim 1 wherein the two intermediate connecting portions next adjoining the free end portions are also provided with aligned holes, and wherein the fastening pin is sufficiently long to pass through both holes at one end of the expander while about half its length protrudes therebeyond; the protruding half of the pin being constructed and arranged to pass through both holes at the opposite end of the expander when the two free end portions are brought together.

3. A construction according to claim 2 wherein the fastening pin is a generally straight length of rod or the like having a relatively sharp crimp or bend, said crimp or bend being located between the free end portion and the adjoining intermediate connecting portion at the first mentioned end of the expander and being of a size and configuration such as to prevent withdrawing movement of the pin relative to said end.

4. A construction according to claim 1 wherein the fastening pin is locked against withdrawal from the first-mentioned end of the expander by a transversely enlarged portion of said pin, larger than the hole in the adjoining free end portion and located between said free end portion and the adjoining intermediate connecting portion.

5. A construction according to claim 1 wherein the fastening pin comprises a longitudinally split compressible tube of resilient metal or the like which is normally tensioned to generally C-shaped cross-sectional configuration with the parallel edges of the split spaced somewhat circumferentially apart, said tube being normally slightly oversize relative to the hole in the free end portion, the compression resulting from insertion into the hole providing a frictional lock against withdrawal.

6. A construction according to claim 1 wherein the fastening pin includes a somewhat resiliently compressible portion normally slightly oversize relative to the hole in the free end portion, the compression resulting from insertion into the hole providing a frictional lock against withdrawal.

7. A construction according to claim 1 wherein the fastening pin includes an axially grooved somewhat resiliently compressible portion normally slightly oversize relative to the free end portion hole so that insertion into the hole results in compression providing a frictional lock against withdrawal, said fastening pin also including an elongated somewhat reduced diameter portion formed in generally co-axial continuation of the grooved portion, said reduced diameter portion being constructed and arranged to protrude outwardly beyond the end of the expander into which the grooved portion is inserted, the reduced diameter protruding portion of the pin being adapted to pass through the hole in the opposite free end portion when the free end portions are brought together.

8. A construction according to claim 1 wherein the expander is generally axially corrugated; the free end portions and the intermediate connecting portions extending more or less axially of the trans-split annulus, with the alternating opposite curved arcuate portions disposed generally in axially displaced planes.

9. A construction according to claim 1 wherein the expander is generally radially corrugated; the free end portions and the intermediate connecting portions extending more or less radially, with the alternating oppositely curved arcuate disposed at the inner and outer peripheral edges of the trans-split annulus.

10. A construction according to claim 9 wherein the radially corrugated expander is slotted to permit passage of lubricating fluid radially therethrough.

11. A construction according to claim 9 wherein oil drain slots are provided in the expander generally along the radially inner arcuate portions thereof.

12. A method of forming a non-bottoming expander for a piston ring or the like comprising the steps of corrugating a strip of resilient metal or the like so as to provide alternating oppositely curved generally arcuate portions and intermediate connecting portions and generally straight free end portions; forming a hole in each of said free end portions; bending the corrugated strip into generally C-shaped configuration so as to provide a trans-split annulus with the free end portions in opposed somewhat circumferentially spaced relationship; inserting an elongated fastening pin through one of the free end portion holes so that a substantial portion of its length protrudes outwardly therebeyond; locking said pin against withdrawing movement from its aforesaid free end portion; and subsequently contracting the trans-split annulus so as to bring the two free end portions into abutting aligned relationship, the protruding portion of the fastening pin passing through the hole in the opposite free end portion during the aforesaid movement of the end portions toward each other, and acting to prevent displacement of the free end portions from their abutting aligned relationship.

13. A method according to claim 12 wherein the pin is locked against withdrawal after insertion into the hole of the free end portion by enlarging it beyond hole size at a point somewhat inward of the free end portion.

14. A method according to claim 12 wherein the pin is locked against withdrawal by frictional engagement of a somewhat resiliently compressible slightly oversize portion of the pin as it is inserted into the hole in the free end portion.

15. A method according to claim 12 wherein aligned holes are also formed in the intermediate connecting portions next adjoining the two free end portions, and wherein the fastening pin is first inserted so that it passes through both holes at one end of the trans-split annulus, and wherein about half the length of the pin protrudes and passes through the two holes at the other end as the end portions move toward each other during contraction.

16. A method according to claim 12 wherein the corrugated strip is bent into a trans-split annulus in such manner that the alternating arcuate portions are axially displaced while the intermediate connecting portions and the free end portions extend generally axially, and wherein the expander is installed behind a piston ring so that its outer peripheral edge provides a generally continuous more or less sinuous contact line with the inner periphery of the piston ring.

17. A method according to claim 12 wherein the corrugated strip is bent into a trans-split annulus in such manner that the arcuate portions are disposed alternately along the outer periphery and the inner periphery of the annulus while the intermediate connecting portions and the free end portions extend generally radially of the annulus, the outer arcuate portions of the expander providing successive circumferentially spaced areas of contact with the inner periphery of the piston ring.

18. A method according to claim 17 wherein oil drain openings are formed in the trans-split annulus to permit radial flow of oil or the like through the expander.

19. A method according to claim 17 wherein oil drain openings are formed in the annulus generally at the radially inner arcuate portions thereof so as to permit radial flow of oil or the like through the expander.

No references cited.